US008766777B2

(12) United States Patent
Hinman et al.

(10) Patent No.: US 8,766,777 B2
(45) Date of Patent: *Jul. 1, 2014

(54) RFID MARKING OF UNITS IN A SPACE

(75) Inventors: Mark P. Hinman, Holley, NY (US);
Edward Zogg, Ontario, NY (US);
Donald Saul Rimai, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 221 days.

This patent is subject to a terminal disclaimer.

(21) Appl. No.: 13/477,422

(22) Filed: May 22, 2012

(65) Prior Publication Data
US 2013/0314212 A1 Nov. 28, 2013

(51) Int. Cl.
| H04Q 5/22 | (2006.01) |
| G08B 13/14 | (2006.01) |
| G08B 1/08 | (2006.01) |
| H04M 1/66 | (2006.01) |
| H01Q 3/00 | (2006.01) |
| G01P 15/00 | (2006.01) |
| G01S 5/04 | (2006.01) |
| G01S 13/87 | (2006.01) |
| G06K 7/10 | (2006.01) |
| H01Q 3/30 | (2006.01) |
| H01Q 3/24 | (2006.01) |
| G01S 1/02 | (2010.01) |

(52) U.S. Cl.
CPC ............... *G01S 5/04* (2013.01); *G01S 13/878* (2013.01); *G06K 7/10079* (2013.01); *H04Q 2213/13095* (2013.01); *H01Q 3/30* (2013.01); *H01Q 3/245* (2013.01); *G01S 1/02* (2013.01)

USPC . 340/10.1; 340/10.4; 340/572.1; 340/539.22; 340/8.1; 340/586; 455/41.1; 455/410; 455/272; 455/41.2; 342/368; 342/463; 342/450; 73/514.01; 343/777; 343/758

(58) Field of Classification Search
CPC ...... G01S 5/04; G01S 13/756; G06K 7/10079
USPC ............ 340/10.1–9, 572.1–8, 568.1, 539.22; 455/410, 41.1–2
See application file for complete search history.

(56) References Cited

U.S. PATENT DOCUMENTS

| 6,169,910 | B1 | 1/2001 | Tamil et al. | |
| 6,725,014 | B1 | 4/2004 | Voegele | |
| 7,086,587 | B2 | 8/2006 | Myllymaki | |
| 7,183,922 | B2 * | 2/2007 | Mendolia et al. | 340/572.1 |
| 7,852,219 | B2 | 12/2010 | Childress et al. | |
| 7,969,286 | B2 | 6/2011 | Adelbert | |

(Continued)

*Primary Examiner* — Fekadeselassie Girma
(74) *Attorney, Agent, or Firm* — Christopher J. White; Raymond L. Owens

(57) ABSTRACT

Non-RFID-active units in a space are marked by affixing RFID tags. Two tags are affixed to each unit, each tag having a directional antenna. The antennas are oriented to define a per-unit reader location. Units are arranged in the space so the per-unit reader locations at least partially overlap to define a reader location. The units in the space can also be detected by an RFID reader located in the overlapping per-unit reader locations. A controller can compare a received list of tag identities corresponding to units expected to be in the container to the identities of the tags read to determine whether the expected units are in the container and disposed at positions and with orientations that cause the respective per-unit reader locations to at least partially overlap with the reader location.

13 Claims, 6 Drawing Sheets

(56) References Cited

U.S. PATENT DOCUMENTS

| | | |
|---|---|---|
| 8,629,762 B2 * | 1/2014 | Sadr et al. .................... 340/10.1 |
| 2009/0021343 A1 | 1/2009 | Sinha |
| 2009/0146816 A1 * | 6/2009 | Patel et al. ................. 340/572.1 |
| 2009/0174556 A1 | 7/2009 | Horne et al. |
| 2011/0156907 A1 * | 6/2011 | Nagai ........................ 340/572.1 |

* cited by examiner

RFID MARKING OF UNITS IN A SPACE

CROSS-REFERENCE TO RELATED APPLICATIONS

This application has related subject matter to U.S. patent application Ser. No. 13/477,379 filed herewith, titled "CONTAINER-CLASSIFICATION IDENTIFICATION USING DIRECTIONAL-ANTENNA RFID," and U.S. patent application Ser. No. 13/477,195, filed herewith, titled "CONTAINER-TYPE IDENTIFICATION USING DIRECTIONAL-ANTENNA RFID" the disclosures of which are hereby incorporated herein by reference.

FIELD OF THE INVENTION

This invention pertains to the field of external identification of containers, particularly identification by wireless communications.

BACKGROUND OF THE INVENTION

Containers of all sizes bear identifying marks describing their structure or contents. Cardboard boxes are labeled with test data such as edge-crush strength. Retail packaging carries advertising and marketing messages for potential buyers. Intermodal containers (shipping containers) carry ISO 6346 serial numbers and size codes. Indicia and markings on containers are used to determine how to handle a container and to dispatch it to a desired location. These indicia are generally printed visually. However, visual indicia can wear off over time or be covered over with graffiti. There is therefore a need for a way of marking containers that retains the ease-of-use of visual indicia but does not exhibit some of the same limitations.

RFID tags are sometimes used to identify containers of products, e.g., products used in various commercial or industrial processes. RFID tags respond to an external RF signal transmitted wirelessly from an RFID reader with a stored identification code or other data. The term "reader" is customary and does not imply that the reader only listens; indeed, RFID readers generally communicate bidirectionally. RFID readers and tags can communicate using, e.g., the EPC Class-1 Generation-2 UHF RFID Protocol for Communications at 860 MHz-960 MHz, Version 1.2.0, Oct. 23, 2008, incorporated herein by reference. A container with a tag affixed thereto is referred to herein as a "tagged container." Tags on containers can carry information about the type of products in those containers and the source of those products.

However, RFID tags generally respond to any RFID reader within range. Containers, especially shipping containers, are often densely packed in a given location. For example, container ship MV Emma Mœrsk can hold approximately 11,000 twenty-foot long intermodal containers (11,000 TEU). Open spaces, such as holding areas for palletized goods awaiting transport, can also contain large numbers of RFID-tagged objects. There is, therefore, a need for a way of selecting which RFID tag a reader should communicate with. There is also a need for a way of confirming that the RFID tag being communicated with corresponds to a particular container.

Various schemes use directional antennas for these purposes. However, directional antennas are not effective with configurations in which multiple RF-transparent tagged containers are arranged along a line extending from the reader, e.g., cardboard boxes loaded on a pallet. In these configurations, it is difficult to determine which container along the line is being read. Moreover, without a way of confirming that a tag being read corresponds to a particular container, an intruder can respond to a reader pretending to be the tag for a particular container. This is referred to as "spoofing." If measures are not taken against spoofing, a spoofer can falsify identification data for a container, possibly exposing shipping companies to liability for mis-shipped goods. This problem is particularly noticeable in relatively less-controlled environments such as freight yards, as compared with factories or other tightly-controlled environments. A spoofer can stand outside the fence of a shipyard and, with a sufficiently powerful RFID reader, spoof RFID tags at a considerable distance.

Moreover, in a space containing multiple units (e.g., boxes, products, or pallets), it is desirable to communicate with RFID tags on units throughout the space without requiring multiple RFID-reader antennas or a mobile RFID reader. In some spaces, such as single-door shipping containers, it can be very difficult to access cargo at the back of the container. It can thus be difficult to determine the condition of cargo in parts of a space.

There is, therefore, a continuing need for a way of reliably determining information about a unit in a space, and of reliably communicating with a particular selected tagged unit. There is also a need for a way of placing units in a space to permit such determination and communication.

SUMMARY OF THE INVENTION

According to an aspect of the present invention, there is provided a method of marking a plurality of non-RFID-active units in a space, the method comprising:

providing the plurality of non-RFID-active units;

affixing two RFID tags to each unit at respective, different tag locations on the unit, each tag including a respective directional antenna steered in a respective, different antenna direction, so that respective directional propagation patterns are defined; and disposing each unit within the space at a respective unit position;

so that the propagation patterns of the tags for each unit intersect to define a respective per-unit reader location with respect to the respective unit position, and the tag locations, antenna directions, and unit positions are selected so that the respective per-unit reader locations for each unit disposed in the space at least partially overlap to define a reader location.

According to another aspect of the present invention, there is provided a method of detecting a plurality of units in a space, the method comprising:

receiving the plurality of non-RFID-active units disposed in the space, each unit at a respective unit position, each unit having affixed thereto two RFID tags at respective, different tag locations on the unit, each tag having a respective identity and including a respective directional antenna steered in a respective, different antenna direction, so that respective directional propagation patterns are defined; wherein the propagation patterns of the tags for each unit intersect to define a respective per-unit reader location with respect to the respective unit position;

activating an RFID reader having an antenna located at a reader location to read the respective identity of one or more of the RFID tags;

using a controller, automatically receiving a list of tag identities corresponding to units expected to be in the space and comparing the identities of the tags read to the received list to determine whether the expected units are in the space and disposed at positions and with orientations that cause the respective per-unit reader locations to at least partially overlap with the reader location.

An advantage of this invention is that it establishes a tamper-evident relationship between a particular unit, that unit's position in the space, and the identification information stored on that unit's RFID tags. By using directional tag antennas with a selected reader antenna, which can be omnidirectional, various embodiments do not require any custom RFID reader hardware, RFID tag integrated circuitry (only custom tag antennas), or unusual capabilities in the mobile station. Various embodiments advantageously provide an identified reader location at which data from the tags can be read. A skimmer, an RFID reader attempting to read the tag data, cannot successfully skim all of the data for the package without displacing a legitimate reader at the reader location. Various embodiments permit reading tags for a large number of units in a space without requiring multiple reader antennas or a mobile reader. Various embodiments place units in a space to permit them to be readily identified, e.g., before unloading. Various embodiments permit detection of rearrangements of units in the space, providing additional tamper-detection capability to a space (e.g., a container) without requiring any particular features of the space or container.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

Figure 1:
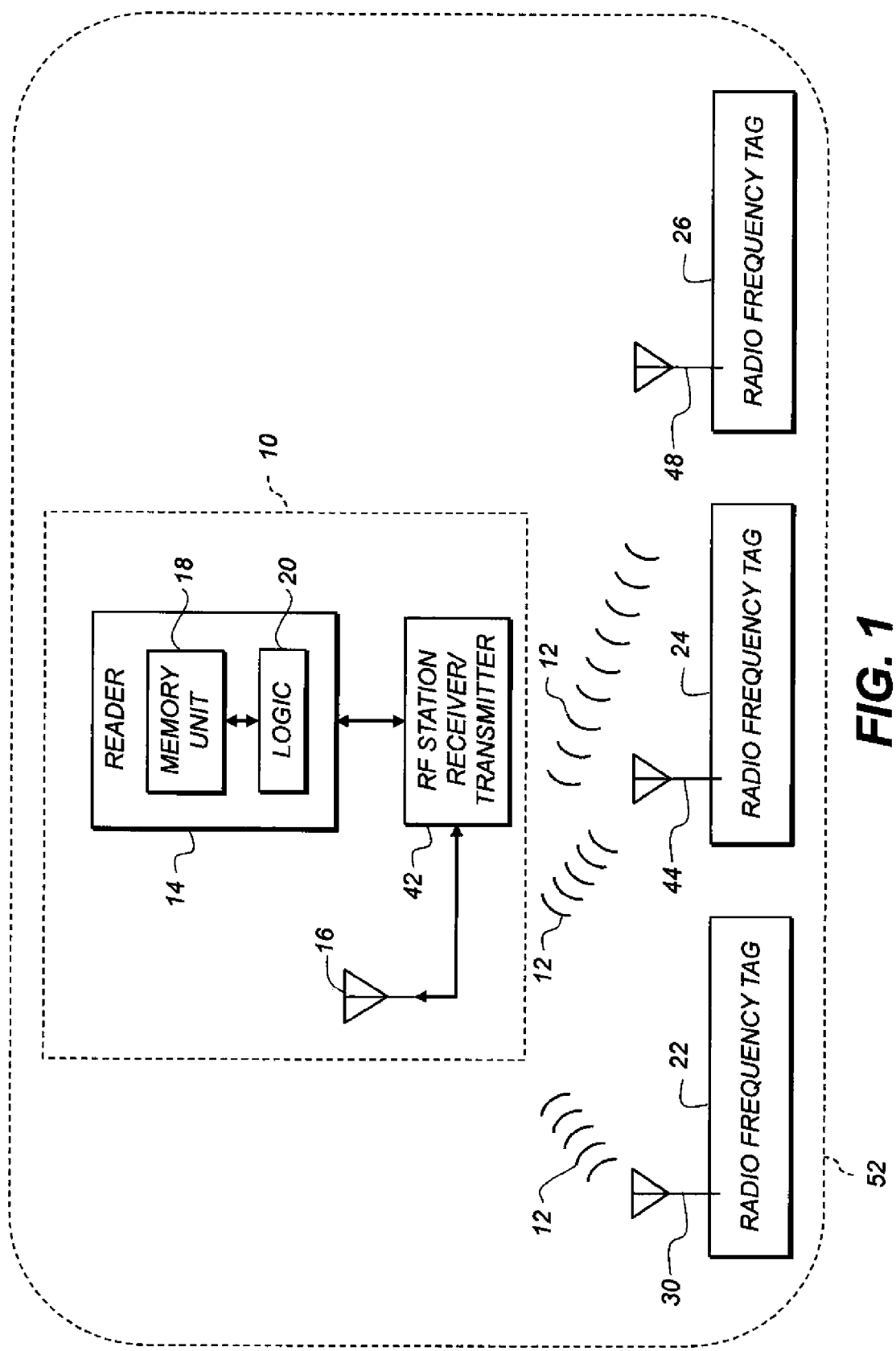
FIG. 1 is a block diagram of an RFID system according to various embodiments.

The attached drawings are for purposes of illustration and are not necessarily to scale.

DETAILED DESCRIPTION OF THE INVENTION

In this disclosure, the term "classification" refers to any information specific to a container. A container's classification can include a unique ID number of the container or its contents; information about container ownership (owner, lessee); or an indication of what kind of container it is, what size it is (dimensions or volume), or what its mechanical properties are (e.g., its strength or maximum gross weight). Other items for which a container has particular values (e.g., paint color) can also be included in the container's classification.

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, methods described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of various embodiments is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various embodiments.

Various electronic equipment or devices can communicate using wireless links. A popular technology for communication with low-power portable devices is radio frequency identification (RFID). Standardized RFID technology provides communication between an interrogator (or "reader") and a "tag" (or "transponder"), a portable device that transmits an information code or other information to the reader. Tags are generally much lower-cost than readers. RFID standards exist for different frequency bands, e.g., 125 kHz (LF, inductive or magnetic-field coupling in the near field), 13.56 MHz (HF, inductive coupling), 433 MHz, 860-960 MHz (UHF, e.g., 915 MHz, RF coupling beyond the near field), or 2.4 GHz, or 5.8 HGz. Tags can use inductive, capacitive, or RF coupling (e.g., backscatter, discussed below) to communicate with readers. Although the term "reader" is commonly used to describe interrogators, "readers" (i.e., interrogators) can also write data to tags and issue commands to tags. For example, a reader can issue a "kill command" to cause a tag to render itself permanently inoperative.

Radio frequency identification systems are typically categorized as either "active" or "passive." In an active RFID system, tags are powered by an internal battery, and data written into active tags can be rewritten and modified. In a passive RFID system, tags operate without an internal power source, instead being powered by received RF energy from the reader. "Semi-active" or "semi-passive" tags use batteries for internal power, but use power from the reader to transmit data. Passive tags are typically programmed with a unique set of data that cannot be modified. A typical passive RFID system includes a reader and a plurality of passive tags. The tags respond with stored information to coded RF signals that are typically sent from the reader. Further details of RFID systems are given in commonly-assigned U.S. Pat. No. 7,969,286 to Adelbert, and in U.S. Pat. No. 6,725,014 to Voegele, both of which are incorporated herein by reference.

RFID tags in general, and specifically passive tags, often do not have enough processing power or memory to perform cryptographic authentication or authorization functions, such as secure hashing with time-varying salt. Consequently, every read of a tag returns the same data. As a result, RFID systems can be vulnerable to attacks in which a rogue (non-authorized) reader placed near a tag reads and stores that tag's data.

This process is called "skimming," and such rogue readers are referred to as "skimmers." The skimmer can later replay the stored data (a "replay attack") to pretend to be the skimmed tag ("spoofing"). This can result in incorrect products being used in industrial or commercial processes, or mishandled inventory in a retail environment, possibly resulting in lost productivity or wasted product. Skimmers can actively interrogate RFID tags, or passively wait and record data sent by tags being interrogated by authorized readers. In other cases, skimmers can passively record the data transfers by which an authorized reader opens a communications session with an RFID tag. The skimmer can then use this information to open a communications session with the RFID tag and make unauthorized changes to data stored on the tag.

Various schemes have been proposed to reduce vulnerability of RFID systems to skimmers. U.S. Patent Publication No. 2009/0174556 by Home et al. describes an RFID blocker that disrupts an RFID reader's signal to a tag when the blacker is physically near the tag. However, the blocker will disrupt all accesses, not just unauthorized access. In another scheme, U.S. Patent Publication No. 2009/0021343 by Sinha describes jamming or spoofing skimmers, either using authorized electronics or intrusion-prevention tags, in response to intrusions or policy violations. U.S. Pat. No. 7,086,587 to Myllymaki describes RFID readers that can detect unauthorized tags, and tags that can detect unauthorized readers. However, none of these schemes reduces the probability of passive monitoring by a skimmer during an authorized read of the tag. Various prior-art schemes use readers with directional antennas to reduce the area of operation in which a skimmer can detect that a read is in progress.

As described in the GS1 EPC Tag Data Standard ver. 1.6, ratified Sep. 9, 2011, incorporated herein by reference, a tag can carry a "Serialized Global Trade Item Number" (SGTIN). Each SGTIN uniquely identifies a particular instance of a trade item, such as a specific manufactured item. For example, a manufacturer of cast-iron skillets can have, as a "product" (in GS1 terms) a 10" skillet. Each 10" skillet manufactured has the same UPC code, called a "Global Trade Item Number" (GTIN). Each 10" skillet the manufacturer produces is an "instance" of the product, in GS1 terms, and has a unique Serialized GTIN (SGTIN). The SGTIN identifies the company that makes the product and the product itself (together, the GTIN), and the serial number of the instance. Each box in which a 10" skillet is packed can have affixed thereto an RFID tag bearing the SGTIN of the particular skillet packed in that box. SGTINs and related identifiers, carried on RFID tags, can permit verifying that the correct products are used at various points in a process.

FIG. 1 is a block diagram of an RFID system according to various embodiments. Base station 10 communicates with three RF tags 22, 24, 26, which can be active or passive in any combination, via a wireless network across an air interface 12. FIG. 1 shows three tags, but any number can be used. Base station 10 includes reader 14, reader's antenna 16 and RF station 42. RF station 42 includes an RF transmitter and an RF receiver (not shown) to transmit and receive RF signals via reader's antenna 16 to or from RF tags 22, 24, 26. Tags 22, 24, 26 transmit and receive via respective antennas 30, 44, 48.

Reader 14 includes memory unit 18 and logic unit 20. Memory unit 18 can store application data and identification information (e.g., tag identification numbers) or SG TINs of RF tags in range 52 (RF signal range) of reader 14. Logic unit 20 can be a microprocessor, FPGA, PAL, PLA, or PLD. Logic unit 20 can control which commands that are sent from reader 14 to the tags in range 52, control sending and receiving of RF signals via RF station 42 and reader's antenna 16, or determine if a contention has occurred.

Reader 14 can continuously or selectively produce an RF signal when active. The RF signal power transmitted and the geometry of reader's antenna 16 define the shape, size, and orientation of range 52. Reader 14 can use more than one antenna to extend or shape range 52.

Figure 2:
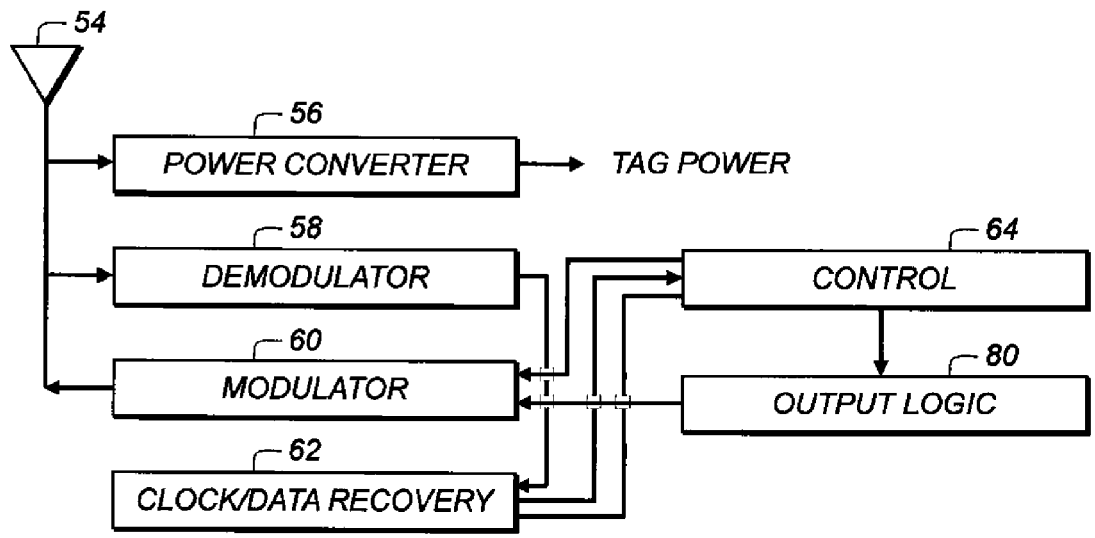
FIG. 2 is a block diagram of a passive RFID tag according to various embodiments.

FIG. 2 is a block diagram of a passive RFID tag (e.g., tags 22, 24, 26 according to an embodiment of the system shown in FIG. 1) according to various embodiments. The tag can be a low-power integrated circuit, and can employ a "coil-on-chip" antenna for receiving power and data. The RFID tag includes antenna 54 (or multiple antennas), power converter 56, demodulator 58, modulator 60, clock/data recovery circuit 62, control unit 64, and output logic 80. Antenna 54 can be an omnidirectional antenna impedance-matched to the transmission frequency of reader 14 (FIG. 1). The RFID tag can include a support, for example, a piece of polyimide (e.g., KAPTON) with pressure-sensitive adhesive thereon for affixing to packages. The tag can also include a memory (often RAM in active tags or ROM in passive tags) to record digital data, e.g., an SGTIN.

Reader 14 (FIG. 1) charges the tag by transmitting a charging signal, e.g., a 915 MHz sine wave. When the tag receives the charging signal, power converter 56 stores at least some of the energy being received by antenna 54 in a capacitor, or otherwise stores energy to power the tag during operation.

After charging, reader 14 transmits an instruction signal by modulating onto the carrier signal data for the instruction signal, e.g., to command the tag to reply with a stored SGTIN. Demodulator 58 receives the modulated carrier bearing those instruction signals. Control unit 64 receives instructions from demodulator 58 via clock/data recovery circuit 62, which can derive a clock signal from the received carrier. Control unit 64 determines data to be transmitted to reader 14 and provides it to output logic 80. For example, control unit 64 can retrieve information from a laser-programmable or fusible-link register on the tag. Output logic 80 shifts out the data to be transmitted via modulator 60 to antenna 54. The tag can also include a cryptographic module (not shown). The cryptographic module can calculate secure hashes (e.g., SHA-1) of data or encrypt or decrypt data using public- or private-key encryption. The cryptographic module can also perform the tag side of a Diffie-Hellman or other key exchange.

Signals with various functions can be transmitted; some examples are given in this paragraph. Read signals cause the tag to respond with stored data, e.g., an SGTIN. Command signals cause the tag to perform a specified function (e.g., kill). Authorization signals carry information used to establish that the reader and tag are permitted to communicate with each other.

Passive tags typically transmit data by backscatter modulation to send data to the reader. This is similar to a radar system. Reader 14 continuously produces the RF carrier sine wave. When a tag enters the reader's RF range 52 (FIG. 1; also referred to as a "field of view") and receives, through its antenna from the carrier signal, sufficient energy to operate, output logic 80 receives data, as discussed above, which is to be backscattered.

Modulator 60 then changes the load impedance seen by the tag's antenna in a time sequence corresponding to the data from output logic 80. Impedance mismatches between the tag antenna and its load (the tag circuitry) cause reflections, which result in momentary fluctuations in the amplitude or phase of the carrier wave bouncing back to reader 14. Reader 14 senses for occurrences and timing of these fluctuations and decodes them to receive the data clocked out by the tag. In various embodiments, modulator 60 includes an output transistor (not shown) that short-circuits the antenna in the time sequence (e.g., short-circuited for a 1 bit, not short-circuited for a 0 bit), or opens or closes the circuit from the antenna to the on-tag load in the time sequence. In another embodiment, modulator 60 connects and disconnects a load capacitor across the antenna in the time sequence. Further details of passive tags and backscatter modulation are provided in U.S. Pat. No. 7,965,189 to Shanks et al. and in "Remotely Powered Addressable UHF RFID Integrated System" by Curty et al., IEEE Journal of Solid-State Circuits, vol. 40, no. 11, November 2005, both of which are incorporated herein by reference. As used herein, both backscatter modulation and active transmissions are considered to be transmissions from the RFID tag. In active transmissions, the RFID tag produces and modulates a transmission carrier signal at the same wavelength or at a different wavelength from the read signals from the reader.

Figure 3:
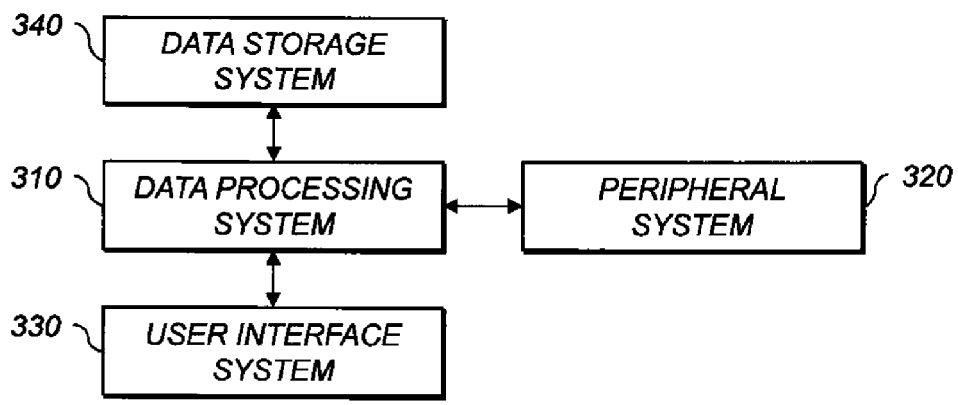
FIG. 3 is a high-level diagram showing the components of a processing system useful with various embodiments.

FIG. 3 is a high-level diagram showing the components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of various embodiments. Data storage system 340 can be a distributed processor-accessible memory system including multiple processor-accessible memories communicatively connected to data processing system 310 via a plurality of computers or devices. Data storage system 340 can also include one or more processor-accessible memories located within a single data processor or device. A "processor-accessible memory" is any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" refers to any type of connection, wired or wireless, between devices, data processors, or programs in which data can be communicated. This phrase includes connections between devices or programs within a single data processor, between devices or programs located in different data processors, and between devices not located in data processors at all. Therefore, peripheral system 320, user interface system 330, and data storage system 340 can be included or stored completely or partially within data processing system 310.

Peripheral system 320 can include one or more devices configured to provide digital content records to data processing system 310, e.g., digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. Peripheral system 320 can be included as part of user interface system 330. User interface system 330 also can include a display device, a processor-accessible memory, or any device or combination of devices to which data is output by data processing system 310. If user interface system 330 includes a processor-accessible memory, such memory can be part of data storage system 340 even though user interface system 330 and data storage system 340 are shown separately in FIG. 1.

Figure 4:
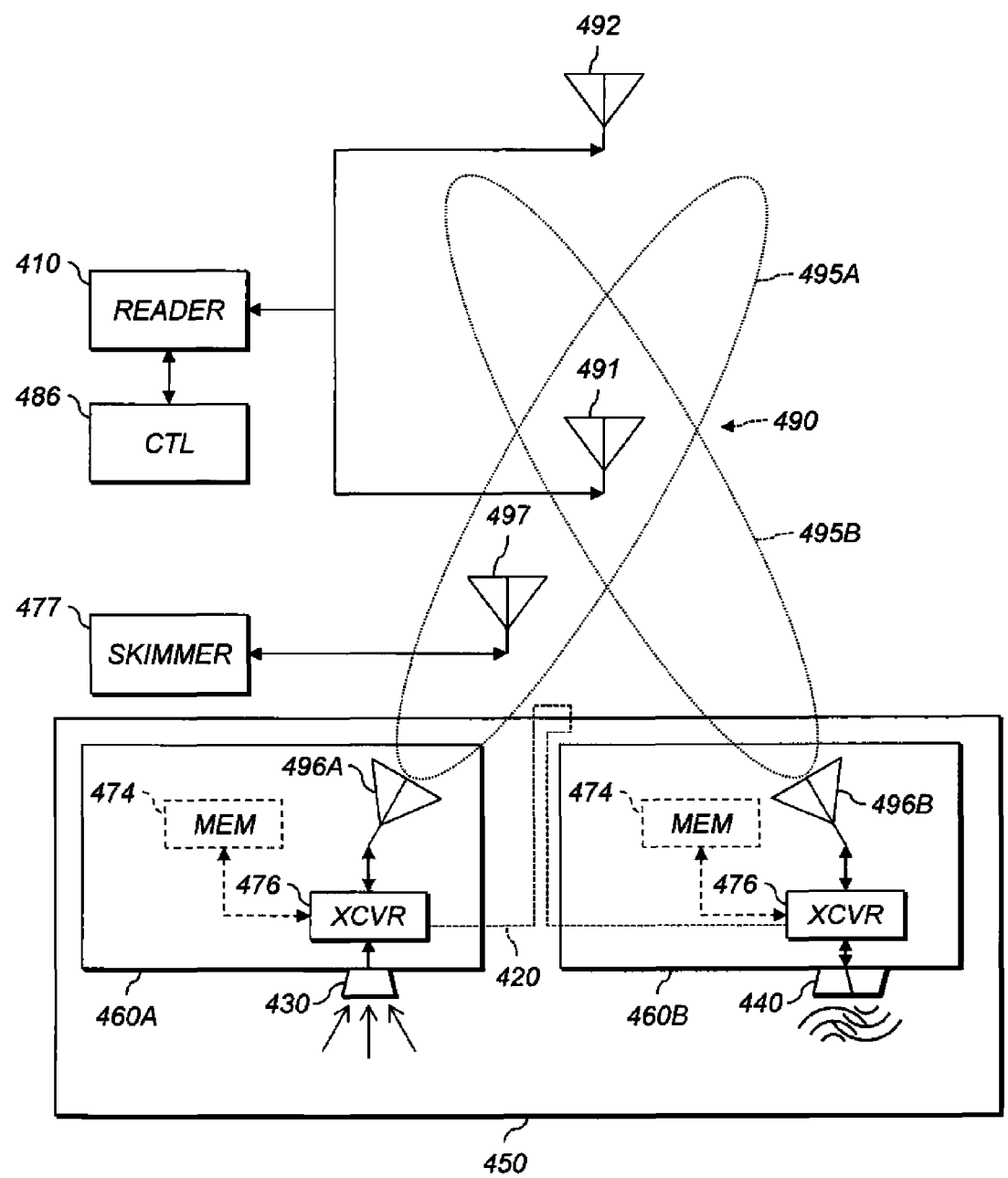
FIG. 4 shows radio-frequency identification (RFID) apparatus according to various embodiments.

FIG. 4 shows radio-frequency identification (RFID) apparatus according to various embodiments.

Object 450 is a non-RFID-active object: object 450 does not respond to queries from RFID reader 410. Object 450 can be a container or shipping crate. Object 450 can block or attenuate RF energy, or not. Two RFID tags 460A, 460B are affixed to object 450 at respective, different tag locations. Tags 460A, 460B can each be active (self-powered in whole or in part) or passive (scavenging power from the RF signal from reader 410). Either tag 460A or 460B can include a memory. Each tag 460A, 46013 includes respective directional antenna 496A, 496B. Antennas 496A, 496B can be mechanically separated from other components of tag 460A, 460B, and connected thereto through a feedline.

Antennas 496A, 496B can be implemented using various directional-antenna technologies. They can be phased-array antennas or not. They can be steered electrically, e.g., by adjusting the time of transmission from each element of a phased-array antenna. They can also be steered mechanically, e.g., by rotating a Yagi or other directional antenna on a mount. Each antenna 496A, 496B transmits in a respective, different direction to define respective directional propagation patterns 495A, 495B. Elliptical propagation patterns 495A, 495B are shown for clarity in the drawing; physical propagation patterns 495A, 495B can be more complexly shaped.

Reader location 490 is defined in the intersection of propagation patterns 495A, 495B. Reader location 490 can be a point, line, area, volume, or other shape. The term "intersection" refers to the volume of space in which RF signals can be transmitted to, and received from, tag antennas 496A, 496B with signal-to-noise ratios (SNR) exceeding a selected threshold (e.g., 40 dB). Components of reader 410 other than antenna 491 can be located away from reader location 490. Antenna 491 can be located away from reader location 490 as long as a suitable waveguide or other structure is provided to convey RF energy from reader location 490 to reader antenna 491.

RFID reader 410 is connected to reader antenna 491 located at the reader location i.e., somewhere within the volume of the intersection. Reader 410 communicates with tags 460A, 460B on behalf of controller 486. Controller 486 can be or include a microprocessor, microcontroller, FPGA, PAL, PLA, PLD, ASIC, or other logic or processing device. In various embodiments, reader 410 is also connected to reader antenna 492, which is not located at reader location 490, as will be discussed below with reference to FIG. 5. In various embodiments, reader antenna 492 has a substantially omnidirectional propagation pattern, or has a substantially omnidirectional propagation pattern in a plane including tag antennas 496A, 496B. For example, reader antenna 492 can be a straight whip antenna or dipole antenna. In these antenna types, radiation is not concentrated by the design of the antenna into a single main lobe Skimmer 477 is an unauthorized reader, using skimmer antenna 497 to attempt to communicate with tags 460A, 460B. In this example, skimmer antenna 497 is in propagation pattern 495A, but not propagation pattern 495B. Therefore, skimmer 477 cannot communicate with tag 460B.

Even if skimmer 477 uses a very high power to attempt to communicate with tag 460B, the responses of tag 460B will be attenuated by the directionality of antenna 496B, reducing the SNR present at tag 460A or received at skimmer 477. In various embodiments, tag antennas 496A, 496B have propagation patterns 495A, 495B with a main lobe oriented in a particular direction, and one or more side lobes with power levels 20 dB or lower with respect to the main lobe. In an example, the tag antenna can have a 3 dB beamwidth of approximately 0.5° and a first side lobe level of approximately 22 dB. Further examples of directional antennas that can be used with various embodiments are given in U.S. Pat. No. 7,501,982 to Charash et al., U.S. Pat. No. 6,167,286 to Ward et al., and U.S. Pat. No. 6,337,628 to Campana, all of which are incorporated herein by reference.

In various embodiments, RFID tags 460A, 460B are passive tags. Therefore, skimmer 477 must broadcast high enough power to activate the tag notwithstanding the attenuation of antenna 496B at its angle to skimmer antenna 497. Skimmer 477 must also have high enough receive sensitivity to hear the backscattered response from the tag through the attenuation of antenna 496B and the noise present, including the noise produced by skimmer 477 itself while transmitting. This advantageously significantly reduces the likelihood that skimmer 477 will be able to communicate with tag 460B.

Tags 460A, 460B include respective transceivers 476 that communicate with reader 410 via antennas 496A, 496B. Each tag 460A, 460B can include memory 474, which can be volatile or non-volatile, and can include RAM, ROM, PROM, EPROM, EEPROM, Flash memory, spin-change memory, MRAM, FRAM, flip-flops, or any other memory technology.

In various embodiments, object 450 is a container. In an example, a plurality of intermodal containers (e.g., 53' shipping containers) can have respective RFID tags 460A, 460B. Tags 460A, 460B can be mounted the same distance apart on any container (object 450), but with different orientations of tag antennas 496A, 496B. Consequently, different containers will have differently-oriented propagation patterns 495A, 495B, and thus different reader locations 490. The position of reader location 490 can encode information about what type or size of container object 450 is, i.e., about the classification of container object 450. For example, different reader locations can correspond to different lengths of container, or one reader location can correspond to normal-height and another to high-cube. In various embodiments, antennas 496A, 496B are oriented to project at an angle of 45° from the normal to the container at the respective tag. As a result, propagation patterns 495A, 495B are substantially at right angles at reader location 490. This provides a well-localized reader location 490.

In various embodiments, object 450 is a container. A selected tag (e.g., tag 460A) includes light sensor 430 disposed in or facing the interior of object 450. Tag 460A monitors a light level in the container using light sensor 430. When the light level in the container (object 450) increases by 100% in less than five seconds, tag 460A records a door-open event in memory 474.

In various embodiments, object 450 is a container including a door (not shown). RFID tags 460A, 460B are electrically connected across the door opening using electrical conductor 420. Conductor 420 thus breaks when the door is opened. Either tag 460A, 460B can store in memory an indication of whether conductor 420 is broken. Alternatively, when queried by reader 410, either tag can detect the continuity of conductor 420 and report to reader 410 appropriately. In various embodiments, conductor 420 is further wrapped around at least two sides of the container (object 450). In other embodiments, conductor 420 is a loop connected to two separate connection points on a single tag (e.g., tag 460A or 460B). Tag 460A (respectively 460B) can measure conductor 420 by time-domain reflectometry (TDR) to determine if a break is closer than a selected distance to the other RFID tag 460B (resp. 460A). Tags 460A or 460B can also apply selected test currents to conductor 420, and each tag can detect current from the other as an indication of continuity.

In various embodiments, object 450 is a container. A selected one of the RFID tags, here tag 460B, includes memory 474. Tag 460B includes or is connected to ultrasonic transducer 440, which it uses to monitor the contents of the container (object 450). When the sonic time-of-flight in the container changes by 50%, tag 460B records a contents-changed event in memory 474.

Figure 5:
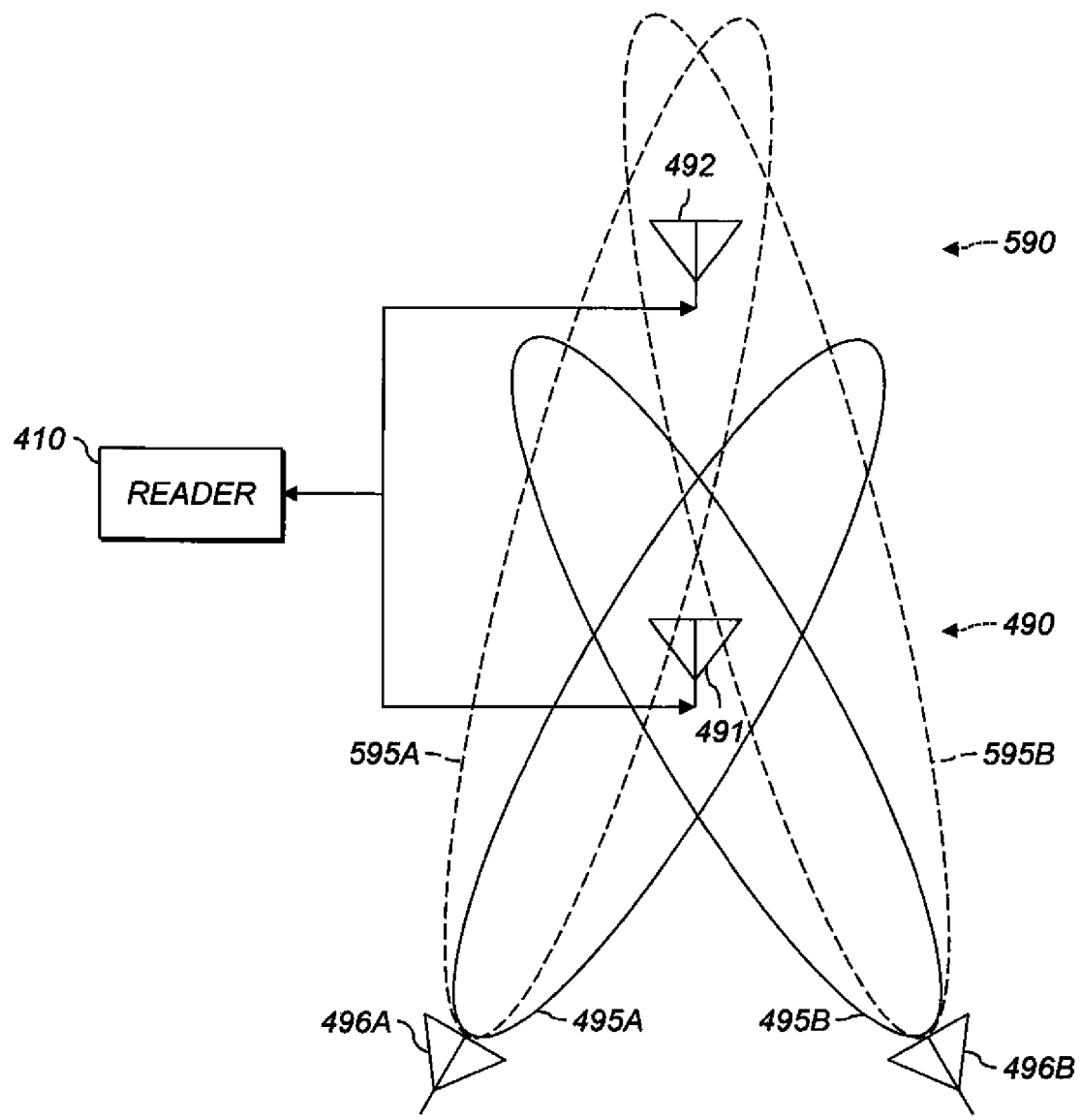
FIG. 5 shows antenna configurations according to various embodiments.

FIG. 5 shows antenna configurations according to various embodiments. Reader 410, reader antenna 491, tag antennas 496A, 496B, propagation patterns 495A, 495B, and reader location 490 are as shown in FIG. 4. Reader is also connected to antenna 492 at second reader location 590 different from location 490. Reader location 590 is at the intersection of propagation pattern 595A, from antenna 496A, and propagation pattern 595B, from antenna 496B. As will be discussed below, reader antenna 491 can be moved between reader locations 490, 590, or two reader antennas 491, 492 can be used to determine which propagation pattern set (495A, 495B or 595A, 595B) is in use by antennas 496A, 496B.

Figure 6:
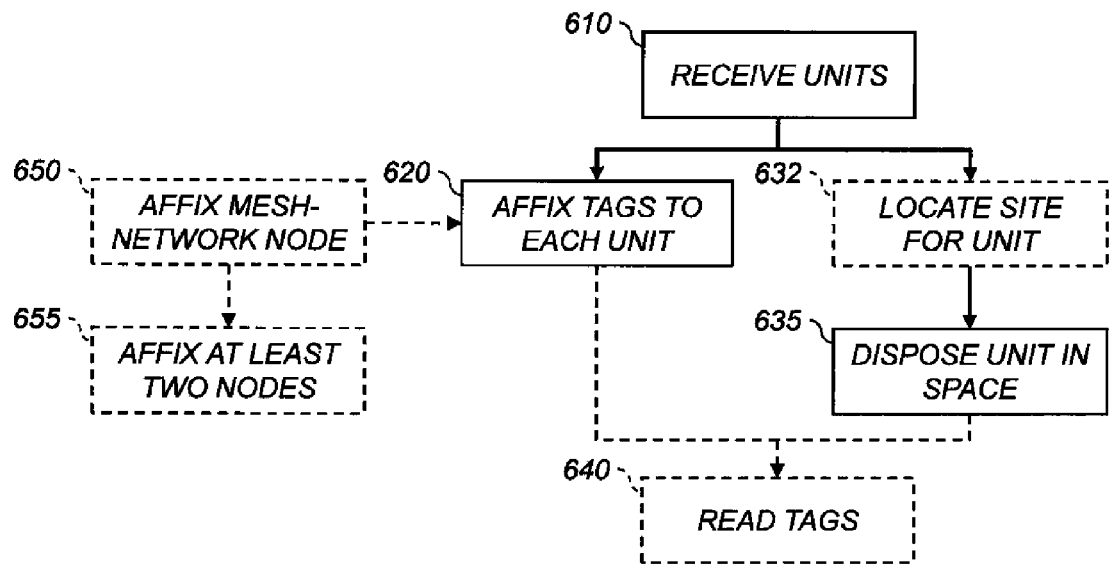
FIG. 6 shows various embodiments of methods of marking a plurality of non-RFID-active units in a space.

FIG. 6 shows various embodiments of methods of marking a plurality of non-RFID-active units in a space. The space can be any volume in which a plurality of units can be disposed and remain or be retained in position. In various embodiments, the space is the space is the interior volume of a container, and the space is large enough to completely enclose at least one unit. In various embodiments, the space is a selected area of the deck of a ship, e.g., a container-freight ship. The space can also be a selected area of a freight yard. Processing begins with step 610.

In step 610, the non-RFID-active units are received (or provided). In various embodiments, each unit is a box, pallet, crate, or container, optionally containing an instance of a product. In various embodiments, each unit is an intermodal container (also referred to as a freight container or shipping container) at least eight feet long. Step 610 is followed by step 620 and step 635 in either order. In some embodiments, step 635 is preceded by step 632.

In step 620, two RFID tags are affixed to each unit at respective, different tag locations on the unit. Tags can be active or passive. Each tag includes a respective directional antenna steered in a respective, different antenna direction, so that respective directional propagation patterns are defined. Examples of such tags and antennas are discussed above with reference to FIG. 4.

In step 635, each unit is disposed within the space at a respective unit position. Units can be placed next to each other or spaced apart from each other, or stacked on top of each other. Each unit can be disposed in the space before or after affixing the respective tags to that unit. Affixing step 620 and disposing step 635 can be performed in any order, and repeated any number of times for different units.

Tags are affixed so that the propagation patterns of the tags for each unit intersect to define a respective per-unit reader location with respect to the respective unit position. Moreover, tags are affixed, tag antennas directed, and units positioned within the space (i.e., the tag locations, antenna directions, and unit positions are selected) so that the respective per-unit reader locations for each unit disposed in the container at least partially overlap to define a reader location. The amount of overlap, and the tolerances on tag-antenna position and direction, can be determined based on product movement during a standard package handling test such as an International Safe Transit Association (ISTA) test. As a result, an RFID reader with a reader antenna located at the reader location can communicate with both tags on each package. An example of such a configuration is discussed below with reference to FIG. 8. In various embodiments, the RFID reader detects relative motion of the per-unit reader locations in the reader location, which can be indicative of shock or vibration experienced by the units. In an example, an ISTA Test Procedure 3E test for unitized loads of the same product is used. The test evaluates, e.g., a pallet of packaged instances held together for transport as a single unit. Shock, compression, and vibration are applied to the loaded pallet. After performing the tests any changes in location or orientation of the packages on the pallet is measured. Antenna beamwidths and directions are then selected so that, even under the motion observed as a result of the testing, the per-unit reader locations overlap.

Tag antenna locations and orientations are selected based on the reader location and the dimensions of the units and the space. IDs or other information stored in the tags can also be selected based on these factors. For example, tags can be assigned respective UUIDs (128-bit Universally Unique IDentifiers, RFC 4122; for example, f50616a0-831e-11e1-82c1-0002a5d5c51b). Unit size and packing density vary depending on the space. For example, pallets can be stacked two across and six high in an intermodal container. Intermodal containers can have various sizes, e.g., 20'L or 40'L, or 93", 98", or 106"H. Container dimensions volumes can vary by manufacturer, e.g., ±1 in in each dimension.

In optional step 632, a respective site is located for the unit to be disposed in the space. The unit is then disposed in the space so that the respective unit location is located at the respective site. In various embodiments, the space includes a plurality of RFID tags having respective, different identifiers. Locating step 632 includes reading the identifiers of at least some of the tags to find a tag with an identifier corresponding to the unit to be disposed and locating the respective site adjacent to or including the location of the corresponding tag. In various embodiments, the space is the deck of a cargo ship.

In various embodiments, steps 620 and 635 are followed by optional step 640. In step 640, an RFID reader having an antenna at the reader location is activated. The RFID reader attempts to read the tags of the units present in the space to verify that both tags of each unit can be read.

In step 650, in various embodiments, a respective mesh-network node is affixed to at least one of the units before disposing the units in the space. Each mesh-network node is an active device adapted to communicate with other mesh-network nodes. In various embodiments, the mesh network is a ZIGBEE network (IEEE 802.15.4 PHY+MAC, plus ZIGBEE network layers). Each RFID tag is adapted to transmit a data value. When a unit bearing one of the mesh-network node(s) is disposed in the space, that mesh-network node joins a mesh network with any other nodes in the space. The mesh-network nodes detect the respective data values of at least one of the RFID tags and transmit the detected ID through the mesh network to a reader outside the space. This permits reading RFID values from inside spaces densely packed with RF-opaque objects. Each mesh-network node can be arranged in the propagation pattern of at least one of the tags. Step 650 is followed by step 620, and can include optional step 655.

In various embodiments, in step 655, at least two respective mesh-network nodes are affixed to at least one of the units. In these embodiments, the units are RF-blocking. The at least two mesh-network nodes are disposed on different sides of the unit. Step 655 further includes electrically connecting the affixed nodes for each unit to permit the nodes to communicate. For example, nodes can be placed on one, two, or all three pairs of opposed faces on a six-sided unit. This permits the nodes to communicate even when the container is large enough and sufficiently RF-attenuating to substantially impede communications between nodes on opposite sides of a unit. Nodes on adjacent units can communicate wirelessly. In various embodiments, temperature sensors or onboard monitors can be placed in the container connected to the nodes. This permits reading out environmental conditions in the container using the nodes. Sensors or monitors can also be connected to a controller that automatically activates a refrigerator or other environmental-control device to keep the sensor measurements within a desired range.

Figure 7:
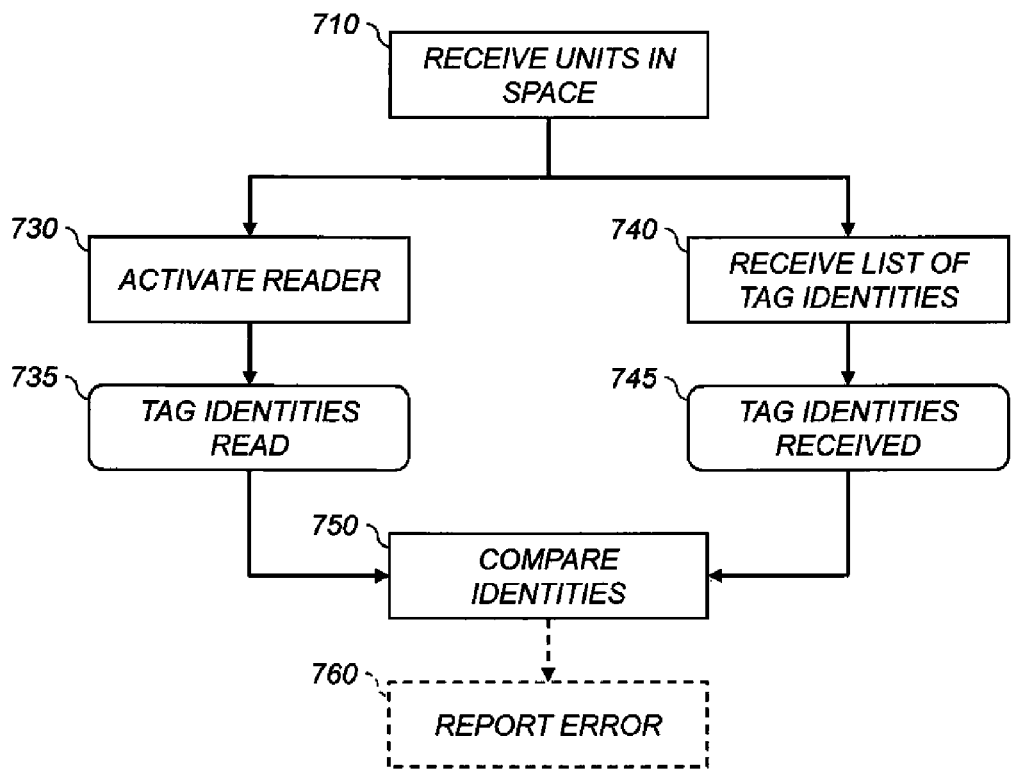
FIG. 7 shows various embodiments of methods of detecting a plurality of units in a space.

FIG. 7 shows various embodiments of methods of detecting a plurality of units in a space. Processing begins with step 710.

In step 710, the plurality of non-RFID-active units disposed in the space are received. Each unit is at a respective unit position. Each unit has affixed thereto two RFID tags at respective, different tag locations on the unit, e.g., as described above with reference to FIG. 4. Each tag has a respective identity and includes a respective directional antenna steered in a respective, different antenna direction, so that respective directional propagation patterns are defined. The propagation patterns of the tags for each unit intersect to define a respective per-unit reader location with respect to the respective unit position. If the units are positioned correctly in the space, the per-unit reader locations for each unit disposed in the container at least partially overlap to define a reader location, as described above. Step 710 is followed by steps 730 and 740 in either order.

In step 730, an RFID reader is activated to read the respective identities of one or more of the RFID tags. The RFID reader has an antenna located at a verification location. Step 730 produces read list 735 of the tag identities read by the RFID reader. Read list 735 is provided to step 750.

In step 740, using a controller, a list of tag identities corresponding to units expected to be in the container is automatically received. Step 740 produces received list 745 of the tag identities received by the controller. Received list 745 is provided to step 750.

In step 750, the controller compares the identities of the tags read from read list 735 to the identities from received list 745 to determine whether the expected units are in the container and disposed at positions and with orientations that cause the respective reader locations to at least partially overlap with the reader location. "Partial overlap" is sufficient overlap for the tags to be read by a reader with an antenna at the reader location. Step 750 is optionally followed by step 760.

In optional step 760, an error is reported if the identities read do not match the received list. The error can be reported to a human through a user interface, or to a computer or other management device, e.g., through an SNMP message.

In an example, each pallet is a unit and is tagged. As pallets are loaded into a shipping container, the interior of which is the space, the tag-antenna orientations are set so that each per-unit reader location is at the center of the door of the container. When the container is opened, the tags can be read from the door. If not all tags on received list 745 can be read, the controller can determine that a pallet is missing, or that the position or orientation of a pallet has been modified since the pallet was loaded. In this way, the position of the per-unit reader location of a particular unit with respect to the reader location of the reader's antenna serves as a "fingerprint" for that unit.

Figure 8:
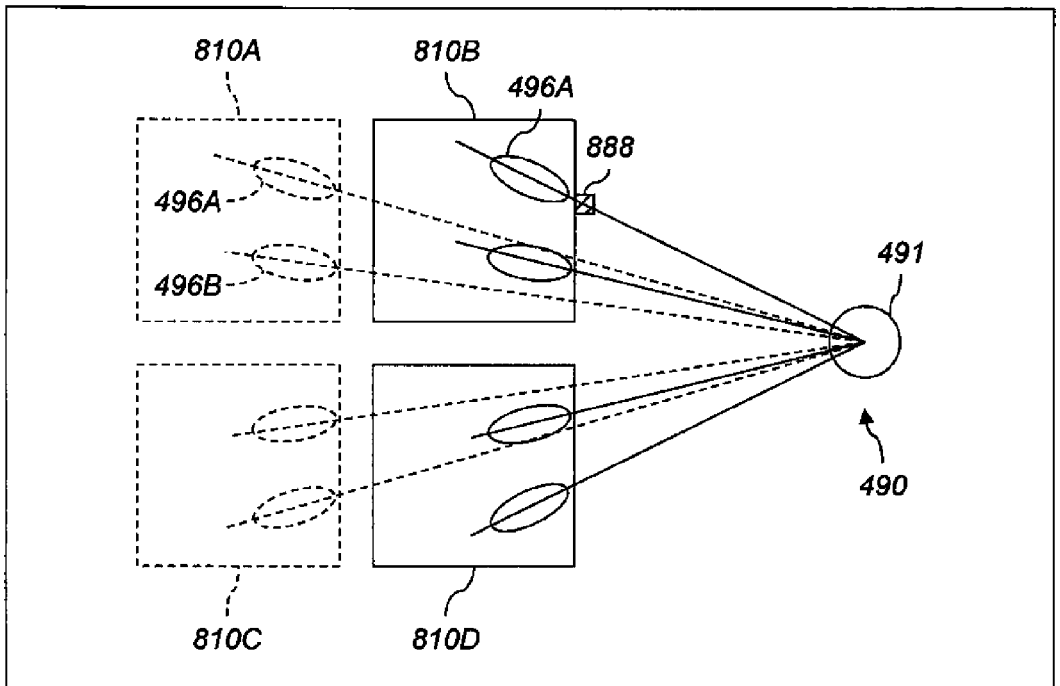
FIG. 8 is a plan view of an example of units disposed in a space.

FIG. 8 is a plan view of an example of units disposed in a space. Units 810A, 810B, 810C, 810D are disposed in space 805. In an example, units 810A, 810B, 810C, 810D are cardboard boxes, and space 805 is the volume above a pallet which cargo loaded on the pallet can occupy. RFID reader antenna 491 is located at reader location 490. For clarity, the back row, units 810A, 810C, is shown dashed; the front row, units 810B, 810D is shown solid.

Each unit 810A, 810B, 810C, 810D has two RFID tag antennas 496A, 496B, represented graphically as ellipses with long axes indicating the direction of propagation. For clarity, the antennas are labeled only on unit 810A. The straight lines between tag antennas 496A, 496B and reader antenna 491 more clearly show that the relative orientations of tag antennas 496A, 496B are different for each unit 810A, 810B, 810C, 810D. The propagation patterns of antennas 496A, 496B for each unit 810A, 810B, 810C, 810D permit the RFID reader to read all eight tags with reader antenna 491 at reader antenna location 490.

FIG. 8 also shows mesh-network node 888 disposed on unit 810B. Node 888 is positioned to communicate with tag 496A on unit 810B. Node 888 is as discussed above with reference to steps 650, 655 (FIG. 6).

Figure 9:
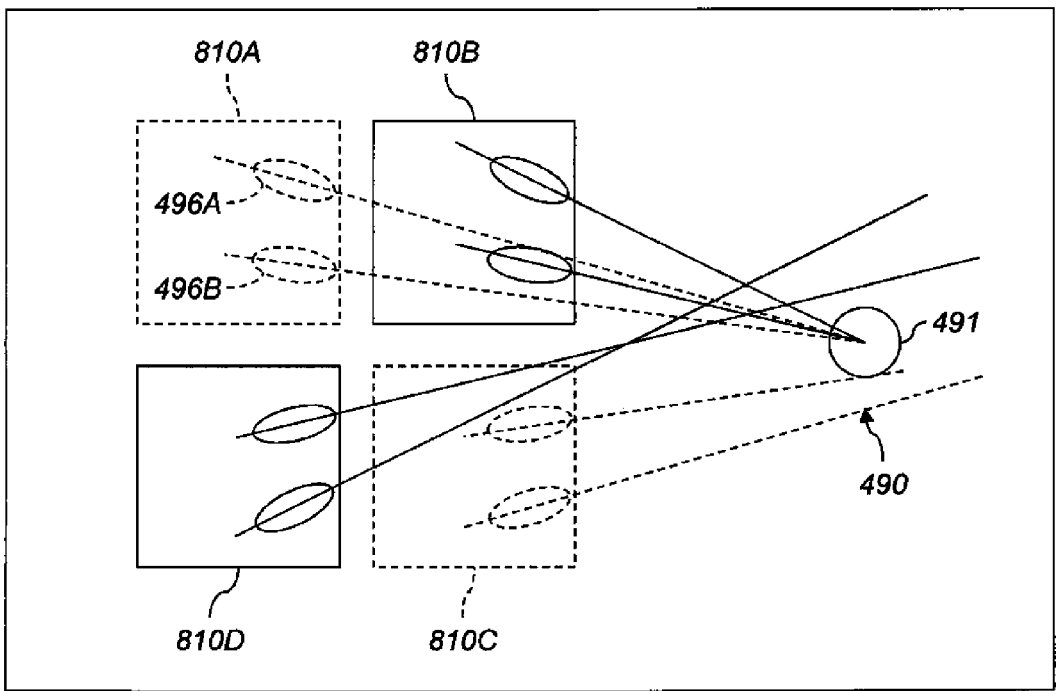
FIG. 9 is a plan view of an example of units disposed in a space when two of the units have been exchanged in position.

FIG. 9 is a plan view of an example of units disposed in a space when two of the units have been exchanged in position. Space 805; tag antennas 496A, 496B; units 810A, 810B, 810C, 810D; reader antenna location 490; and reader antenna 491 are as shown in FIG. 8. However, units 810C and 810D have been misplaced in space 805. As shown, reader antenna 491 is not permitted to communicate effectively with the tags on either unit 810C or unit 810D. Continuing this example with reference to FIG. 7, read list 735 will include only units 810A and 810B, but received list 745 will include all four units 810A, 810B, 810C, 810D. The controller will determine that units 801C and 810D are missing or misplaced.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST

10 base station
12 air interface
14 reader
16 reader's antenna
18 memory unit
20 logic unit
22, 24, 26 RFID tag
30, 44, 48 antenna
42 RF station
52 range
54 antenna
56 power converter
58 demodulator
60 modulator
62 clock/data recovery circuit
64 control unit
80 output logic
310 data processing system
320 peripheral system
330 user interface system
340 data storage system
410 RFID reader
420 conductor
430 light sensor
440 ultrasonic transducer
450 object
460A, 460B RFID tag
474 memory
476 transceiver
476 transceiver
477 skimmer
486 controller
490 reader location
491, 492 reader antenna
495A, 495B propagation pattern
496A, 496B tag antenna
497 skimmer antenna
590 reader location
595A, 595B propagation pattern
610 receive units step
620 affix tags to each unit step
632 locate site step
635 dispose unit in space step
640 read tags step
650 affix mesh-network node step
655 affix at least two nodes step
710 receive units in space step
730 activate reader step
735 list of tag identities read
740 receive list of tag identities step
745 list of tag identities received
750 compare identities step
760 report error step
805 space
810A, 810B unit
810C, 810D unit
888 mesh-network node

The invention claimed is:

1. A method of marking a plurality of non-RFID-active units in a space, the method comprising: providing the plurality of non-RFID-active units;
affixing two RFID tags to each unit at respective, different tag locations on the unit, each tag including a respective directional antenna steered in a respective, different antenna direction, so that respective directional propagation patterns are defined; and
disposing each unit within the space at a respective unit position; so that the propagation patterns of the tags for each unit intersect to define a respective per-unit reader location with respect to the respective unit position, and the tag locations, antenna directions, and unit positions are selected so that the respective per-unit reader locations for each unit disposed in the space at least partially overlap to define a reader location;
activating an RFID reader having an antenna at the reader location to verify that both tags of each unit can be read.

2. The method according to claim 1, wherein the space is the interior volume of a container, and the space is large enough to completely enclose at least one unit.

3. The method according to claim 1, wherein the space is a selected area of the deck of a ship.

4. The method according to claim 3, wherein each unit is an intermodal container at least eight feet long.

5. The method according to claim 1, wherein each RFID tag is adapted to transmit a data value, the method further including affixing a respective mesh-network node to at least one of the units before disposing the units in the space, so that when a unit bearing one of the mesh-network node(s) is disposed in the space, that mesh-network node joins a mesh-network with any other nodes in the space, detects the respective data value(s) of at least one of the RFID tags, and transmits the detected data value(s) through the mesh-network to a reader outside the space.

6. The method according to claim 5, wherein the units are RF-blocking, and the mesh-network-affixing step includes affixing at least two respective mesh-network nodes to at least one of the units, the mesh-network nodes being disposed on different sides of the at least one of the units, and electrically connecting the affixed nodes for each unit to permit the nodes to communicate.

7. The method according to claim 1, wherein the RFID tags are passive tags.

8. The method according to claim 1, further including locating a respective site for each unit before disposing that unit, so that the respective unit location is located at the respective site.

9. The method according to claim 8, wherein the space includes a plurality of RFID tags having respective, different identifiers, and the locating step includes reading the identifiers of at least some of the tags to find a tag with an identifier corresponding to the unit to be disposed and locating the respective site adjacent to or including the location of the corresponding tag.

10. A method of detecting a plurality of non-RFID-active units in a space, the method comprising:
receiving the plurality of non-RFID-active units disposed in the space, each unit at a respective unit position, each unit having affixed thereto two RFID tags at respective, different tag locations on the unit, each tag having a respective identity and including a respective directional antenna steered in a respective, different antenna direction, so that respective directional propagation patterns are defined; wherein the propagation patterns of the tags for each unit intersect to define a respective per-unit reader location with respect to the respective unit position;
activating an RFID reader having an antenna located at a reader location to read the respective identity of one or more of the RFID tags;
using a controller, automatically receiving a list of tag identities corresponding to units expected to be in the space and comparing the identities of the tags read to the received list to determine whether the expected units are in the space and disposed at positions and with orientations that cause the respective per-unit reader locations to at least partially overlap with the reader location.

11. The method according to claim 10, further including reporting an error if the respective identities read do not match the received list.

12. The method according to claim 10, wherein the RFID tags are passive tags.

13. The method according to claim 10, wherein the space is the interior volume of a container, and the space is large enough to completely enclose at least one unit.

* * * * *